United States Patent
Hettenkofer et al.

(10) Patent No.: US 11,105,466 B2
(45) Date of Patent: Aug. 31, 2021

(54) METHOD FOR SETTING THE TEMPERATURE AND/OR THE PRESSURE OF FUEL, IN PARTICULAR OF HYDROGEN, IN MULTIPLE PRESSURE VESSELS OF A VEHICLE TO IN EACH CASE ONE TEMPERATURE SETPOINT VALUE AND/OR IN EACH CASE ONE PRESSURE SETPOINT VALUE BEFORE A FILLING PROCESS OF THE PRESSURE VESSELS

(71) Applicant: Bayerische Motoren Werke Aktiengesellschaft, Munich (DE)

(72) Inventors: Simon Hettenkofer, Munich (DE); Andreas Pelger, Ismaning (DE); Stefan Schott, Munich (DE); Andreas Schaefer, Schwabhausen (DE); Klaus Szoucsek, Haimhausen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 23 days.

(21) Appl. No.: 16/270,361

(22) Filed: Feb. 7, 2019

(65) Prior Publication Data
US 2019/0170299 A1    Jun. 6, 2019

Related U.S. Application Data

(63) Continuation of application No. PCT/EP2017/066932, filed on Jul. 6, 2017.

(30) Foreign Application Priority Data

Aug. 8, 2016   (DE) .................. 10 2016 214 680.7

(51) Int. Cl.
*F17C 5/06*    (2006.01)
*F17C 13/00*   (2006.01)

(52) U.S. Cl.
CPC ............... *F17C 5/06* (2013.01); *F17C 13/00* (2013.01); *F17C 2201/0109* (2013.01);
(Continued)

(58) Field of Classification Search
CPC ............... F17C 2201/0109; F17C 5/06; F17C 2221/012; F17C 2223/0123;
(Continued)

(56) References Cited

U.S. PATENT DOCUMENTS 2,485,231 A * 10/1949 Bond .................. C09K 8/16
                                                         507/139
4,540,531 A *  9/1985 Moy .................. B01F 3/022
                                                         261/141

(Continued)

FOREIGN PATENT DOCUMENTS

CA         2930923 A1 *  5/2015 ............ F17C 13/025
DE    11 2010 005 543 T5    2/2013
(Continued)

OTHER PUBLICATIONS

PCT/EP2017/066932, International Search Report dated Sep. 28, 2017 (Two (2) pages).
(Continued)

*Primary Examiner* — Angelisa L. Hicks
(74) *Attorney, Agent, or Firm* — Crowell & Moring LLP

(57) ABSTRACT

A method for adjusting temperature and/or pressure of fuel in a pressured container system of a vehicle to a respective temperature setpoint and/or a respective pressure setpoint before a process of filling the pressurized containers includes extracting fuel from a first pressurized container having a first temperature and a first pressure, to bring the first temperature and/or the first pressure of the fuel closer to the temperature setpoint and/or to the pressure setpoint of the first pressurized container. The method also includes
(Continued)

supplying the extracted fuel to either a fuel conversion device to power the vehicle or into a second pressurized container, where fuel in the second pressurized container has a second temperature and a second pressure, to bring the second temperature and/or the second pressure of the fuel closer to the temperature setpoint and/or to the pressure setpoint of the second pressurized container. The temperature setpoints and/or the pressure setpoints are determined such that, without exceeding the respective maximum operating pressure and the respective maximum operating temperature of the respective pressurized container, the amount of fuel introduced from a single filling source by a process of filling the pressurized containers which is carried out at the same time and for the same length of time is maximized.

20 Claims, 2 Drawing Sheets

(52) U.S. Cl.
CPC   *F17C 2221/012* (2013.01); *F17C 2223/0123* (2013.01); *F17C 2225/0123* (2013.01); *F17C 2227/04* (2013.01); *F17C 2227/041* (2013.01); *F17C 2227/043* (2013.01); *F17C 2227/046* (2013.01); *F17C 2227/047* (2013.01); *F17C 2265/065* (2013.01); *F17C 2265/066* (2013.01); *F17C 2270/0168* (2013.01); *Y02E 60/32* (2013.01)

(58) Field of Classification Search
CPC .......... F17C 2225/0123; F17C 2227/04; F17C 2227/041; F17C 2227/043; F17C 2270/0168; Y02E 60/321
See application file for complete search history.

(56) References Cited

U.S. PATENT DOCUMENTS

| | | | | |
|---|---|---|---|---|
| 5,251,473 | A * | 10/1993 | Reese | B60S 5/02 137/264 |
| 5,465,583 | A * | 11/1995 | Goode | F17C 5/007 141/4 |
| 5,615,702 | A * | 4/1997 | Dawans | B60K 15/07 137/255 |
| 6,651,701 | B2 * | 11/2003 | Kuriiwa | C01B 3/0005 137/14 |
| 6,655,422 | B2 * | 12/2003 | Shock | B65B 31/00 141/1 |
| 8,714,183 | B2 | 5/2014 | Mori et al. | |
| 2002/0046773 | A1 * | 4/2002 | Bishop | B63B 25/16 137/259 |
| 2009/0211264 | A1 * | 8/2009 | McKitish | F17C 5/02 62/50.7 |
| 2011/0302933 | A1 * | 12/2011 | Immel | F17C 11/005 62/51.1 |
| 2013/0248000 | A1 * | 9/2013 | Killeen | F17D 3/00 137/14 |
| 2015/0219279 | A1 * | 8/2015 | Pelger | F17C 5/06 141/4 |
| 2016/0201852 | A1 | 7/2016 | Whiteman et al. | |

FOREIGN PATENT DOCUMENTS

| | | |
|---|---|---|
| DE | 10 2012 208 821 A1 | 11/2013 |
| DE | 11 2011 100 541 B4 | 6/2014 |
| EP | 1 546 601 B1 | 8/2007 |
| WO | WO 2012/038039 A1 | 3/2012 |

OTHER PUBLICATIONS

German Search Report issued in German counterpart application No. 10 2016 214 680.7 dated Mar. 15, 2017, with Statement of Relevancy (Six (6) pages).

* cited by examiner

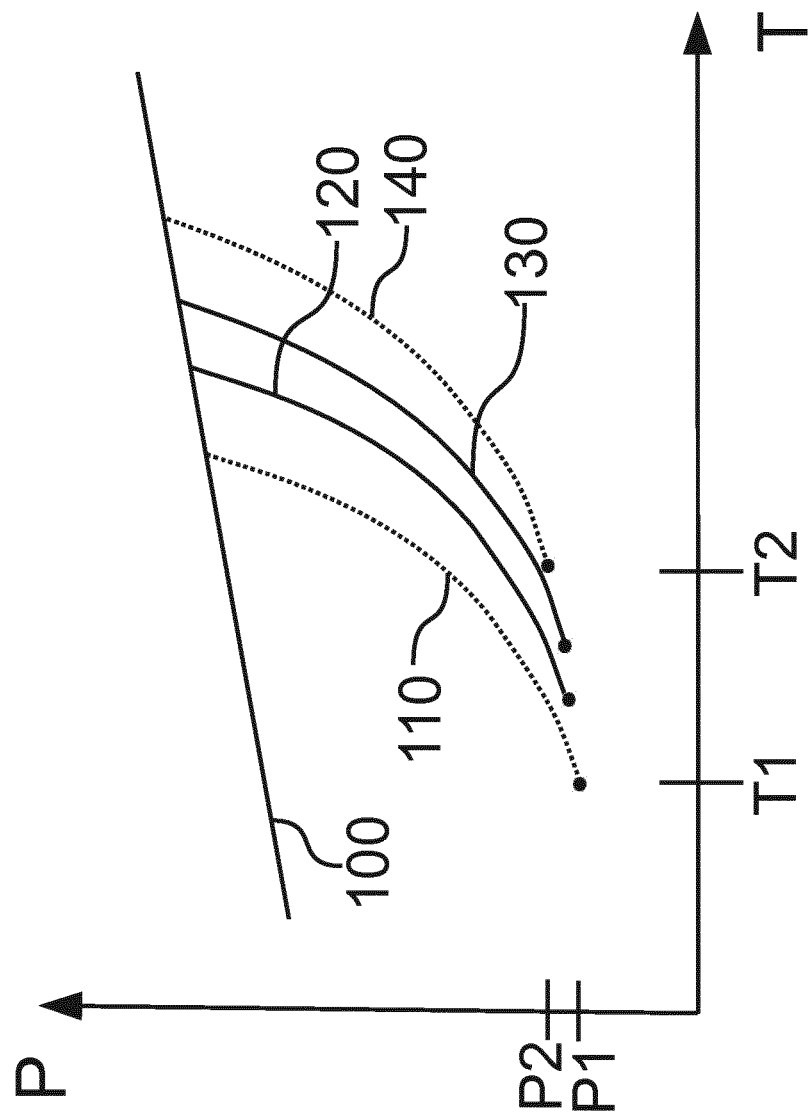

METHOD FOR SETTING THE TEMPERATURE AND/OR THE PRESSURE OF FUEL, IN PARTICULAR OF HYDROGEN, IN MULTIPLE PRESSURE VESSELS OF A VEHICLE TO IN EACH CASE ONE TEMPERATURE SETPOINT VALUE AND/OR IN EACH CASE ONE PRESSURE SETPOINT VALUE BEFORE A FILLING PROCESS OF THE PRESSURE VESSELS

CROSS REFERENCE TO RELATED APPLICATIONS

This application is a continuation of PCT International Application No. PCT/EP2017/066932, filed Jul. 6, 2017, which claims priority under 35 U.S.C. § 119 from German Patent Application No. 10 2016 214 680.7, filed Aug. 8, 2016, the entire disclosures of which are herein expressly incorporated by reference.

BACKGROUND AND SUMMARY OF THE INVENTION

The invention relates to a method for adjusting the temperature and/or the pressure of fuel, in particular of hydrogen, in a plurality of pressurized containers of a vehicle to a respective temperature setpoint and/or a respective pressure setpoint before a process of filling the pressurized containers, and to a pressurized container system in a vehicle, comprising a plurality of pressurized containers and a control unit.

In vehicles which are powered by CNG or $CGH_2$, a pressurized container system often includes a plurality of pressurized containers or pressure tanks, in which the fuel or the gas or the hydrogen is stored. The fuel is supplied from the pressurized containers to a fuel conversion device which is designed to power the vehicle. The sizes and volumes of the pressurized containers can differ. The extraction of fuel from the pressurized containers during the operation of the vehicle can also be different. At the start of a process of filling the pressurized containers, in which the pressurized containers are filled with fuel by a (single) filling system (e.g. a filling station) or a (single) filling source at the same time and for the same length of time, the fuel in the pressurized containers can have different temperatures and/or pressures from one another. The temperatures and pressures in the pressurized containers thus develop very differently. Since the process of filling is ended as soon as the target refueling pressure has been reached in one or a first of the pressurized containers, under unfavorable conditions, the other pressurized containers may not have been filled completely (i.e. up to the target refueling pressure). Thus, under unfavorable conditions, some pressurized containers of the pressurized container system, and thus the pressurized container system as a whole, may have less than the maximum filling state (state of charge). Therefore, under unfavorable conditions, the process of filling does not introduce as much fuel as possible into the pressurized container system.

High-pressure gas container systems (also referred to as "CGH2 systems") are designed to store fuel on an ongoing basis at a pressure of over approx. 350 bar gage (=positive pressure relative to the atmospheric pressure), more preferably of over approx. 500 bar gage, and particularly preferably of over approx. 700 bar gage.

Cryogenic pressurized container systems (also referred to as "CcH2 systems") are known from the prior art. For example, EP 1 546 601 B1 discloses such a system.

A preferred objective of the technology disclosed here is to reduce or remedy at least some disadvantages of the previously known solutions. Further preferred objectives can result from the advantageous effects of the technology disclosed here. The objective(s) is/are achieved by the subject matter of claim 1 of the independent claims and by the subject matter of claim 8 of the independent claims. The dependent claims represent preferred embodiments.

In particular, the objective is achieved by a method for adjusting the temperature and/or the pressure of fuel in a plurality of pressurized containers of a vehicle to a respective temperature setpoint and/or a respective pressure setpoint before a process of filling the pressurized containers, comprising the following steps: extracting fuel from a first pressurized container, wherein the fuel in the first pressurized container has a first temperature and a first pressure, to bring the first temperature and/or the first pressure of the fuel closer to the temperature setpoint and/or to the pressure setpoint of the first pressurized container, and depending on the decision of a control unit, supplying the fuel extracted from the first pressurized container to a fuel conversion device to power the vehicle, or into a second pressurized container, wherein the fuel in the second pressurized container has a second temperature and a second pressure, to bring the second temperature and/or the second pressure of the fuel closer to the temperature setpoint and/or to the pressure setpoint of the second pressurized container, wherein the temperature setpoints and/or the pressure setpoints of the pressurized containers are determined in such a way that, without exceeding the respective maximum operating pressure and the respective maximum operating temperature of the respective pressurized container, the amount of fuel introduced from a single filling source by a process of filling the pressurized containers which is carried out at the same time and for the same length of time is as high as possible.

One advantage of this is that more fuel or a large amount of fuel can be introduced into the pressurized container system in a process of filling. The range of the vehicle is thus increased.

The steps of the method can be carried out when the control unit detects that a process of filling the pressurized containers is imminent. One advantage of this is that more fuel or a large amount of fuel can be introduced into the pressurized container system in a process of filling without the need to accept a waiting period at the filling source in which the vehicle stands at the filling source, and the driver has to wait for the temperatures and/or pressures to be adjusted by overflow from one pressurized container into the others.

The temperature setpoints and/or the pressure setpoints of the pressurized containers are determined based on characteristic curve families for the pressurized containers, wherein the characteristic curve families each have a plurality of characteristic curves for the temperature of the fuel according to the pressure of the fuel for different initial conditions of the fuel in the respective pressurized containers at the start of the process of filling the pressurized containers with fuel from a single filling source. As a result, the temperatures and/or pressures of the respective pressurized containers can be determined in a technically simple manner and with low processing power, in which, during the process of filling, a particularly large amount of fuel can be introduced into the pressurized container system. Each pressurized container can thus have a corresponding characteristic curve family. The initial conditions of the fuel in the pressurized containers include the temperature, the pressure and the amount and/or the density of the fuel in the respective pressurized container.

The temperature setpoints and/or the pressure setpoints of the pressurized containers can be determined based on a plurality of characteristic curve family groups for different temperatures of the fuel to be filled and/or different temperatures of the respective pressurized container, wherein each characteristic curve family group includes a plurality of characteristic curve families for the temperature of the fuel according to the pressure of the fuel for the different pressurized containers during the process of filling the pressurized containers with fuel from a single filling source. The advantage of this is that, by taking into account the additional variables, the temperature setpoints and/or pressure setpoints of the pressurized containers can be determined in an even more precise technically simple manner so that even more fuel can be introduced into the pressurized container system in the setpoint.

When determining the temperature setpoints and/or the pressure setpoints of the pressurized containers, pressure losses during transport from the refueling coupling of the vehicle, for connecting the pressurized containers to the filling source, to the respective pressurized containers can be taken into consideration. As a result, the amount of fuel introduced into the pressurized containers can be increased even further.

The temperature setpoints and/or the pressure setpoints in the plurality of pressurized containers can be determined according to properties of the filling system, by means of which it is planned to fill the pressurized containers, in particular according to the temperature of the fuel in the filling system and/or the maximum final refueling pressure of the filling system. One advantage of this is that the amount of fuel which can be introduced into the pressurized container system in the setpoint is further increased. The standard SAE J2600_201510, published on Oct. 21, 2015, describes the temperature of the fuel pre-cooled in the filling station or filling system or filling source and which pressure slopes (according to temperature and vehicle data such as pressure of the fuel, temperature of the fuel in the pressurized containers of the vehicle, storage volumes of the pressurized containers and contents of the pressurized containers) of the filling station or filling system are selected to fill the pressurized containers. It is thus sufficient to detect the ambient temperature in order to determine the pressure slope with which the filling system (e.g. the filling station) refuels or fills the pressurized containers. On the basis of these refueling slopes and the vehicle data, the target temperatures and target pressures at the end of the refueling can be calculated (or determined by means of characteristic maps).

The control unit can make the decision as to whether the fuel extracted from the first pressurized container is supplied to the fuel conversion device or to the second pressurized container depending on whether enough time remains until the planned process of filling the pressurized containers to match the temperatures and/or the pressures of the pressurized containers to the respective temperature setpoints and/or pressure setpoints of the pressurized containers solely by a selective extraction of fuel from the pressurized container(s) of which the temperatures and/or pressures do not already correspond to the respective temperature setpoints and/or pressure setpoints, and supplying the fuel to the fuel conversion device. As a result, an overflow of fuel from one pressurized container into the other pressurized containers can be avoided in some circumstances.

In particular, the objective is achieved by a pressurized container system in a vehicle, comprising a plurality of pressurized containers and a control unit, wherein the pressurized containers are designed to store a fuel and are fluidically connected to one another and to a fuel conversion device by valves, wherein the control unit is designed to open and/or close the valves in such a way that fuel can be extracted from a first pressurized container, wherein the fuel in the first pressurized container has a first temperature and a first pressure, and that the fuel extracted from the first pressurized container is supplied to a fuel conversion device, or into a second pressurized container, wherein the fuel in the second pressurized container has a second temperature and a second pressure, wherein the control unit is designed in such a way that the temperatures and/or the pressures of the fuel in the plurality of pressurized containers can be adjusted by means of the control unit to a respective temperature setpoint and/or a respective pressure setpoint before a process of filling the pressurized containers in such a way that, in the plurality of pressurized containers, the amount of fuel introduced by a process of filling the pressurized containers from a single filling source, which is carried out at the same time and for the same length of time, is as high as possible without exceeding the maximum operating pressure and the respective maximum operating temperature of the respective pressurized container. One advantage of this is that more fuel or a large amount of fuel can be introduced into the pressurized container system in a setpoint. The range of the vehicle is thus increased.

The control unit can be designed in such a way that the control unit makes the decision as to whether the fuel extracted from the first pressurized container is supplied to the fuel conversion device or to the second pressurized container depending on whether enough time remains until the planned process of filling the pressurized containers to match the temperatures and/or the pressures of the pressurized containers to the respective temperature setpoints and/or pressure setpoints of the pressurized containers solely by a selective extraction of fuel from the pressurized container(s) of which the temperatures and/or pressures do not already correspond to the respective temperature setpoints and/or pressure setpoints, and supplying the fuel to the fuel conversion device. As a result, an overflow of fuel from one pressurized container into the other pressurized containers can be avoided in some circumstances.

The control unit can be designed in such a way that the control unit determines the temperature setpoints and/or the pressure setpoints of the pressurized containers based on characteristic curve families, wherein the characteristic curve families each have a plurality of characteristic curves for the temperature of the fuel according to the pressure of the fuel for different initial conditions of the fuel in the respective pressurized containers at the start of a process of filling the pressurized containers with fuel from a single filling source. As a result, the temperatures and/or pressures of the pressurized containers can be determined in a technically simple manner and with low processing power, in which, during the setpoint, a particularly large amount of fuel can be introduced into the pressurized container system. Each pressurized container can thus have a characteristic curve family. The initial conditions of the fuel in the pressurized containers include the temperature, the pressure and the amount and/or the density of the fuel in the respective pressurized containers.

The fuel can be a gaseous fuel (at a standard pressure of 1,000 bar and standard temperature of 0° C.), in particular hydrogen.

Only the maximum amount of fuel required is supplied to the fuel conversion device.

The technology disclosed here relates inter alia to a pressurized container system (compressed hydrogen storage system (=CHS system)) for storing fuel which is gaseous under ambient conditions. A pressurized container of this type is in particular a pressurized container which is or can be installed in a motor vehicle. The pressurized container can be used in a motor vehicle which is powered for example by compressed (compressed natural gas=CNG) or liquid (LNG) natural gas or by hydrogen. The pressurized container can be for example a cryogenic pressurized container (=CcH2) or a high-pressure gas container (=CGH2). High-pressure gas containers are designed, substantially at ambient temperatures, to continuously store fuel (e.g. hydrogen) at a maximum operating pressure (MOP) of over approx. 350 bar gage (=positive pressure relative to the atmospheric pressure), more preferably of over approx. 500 bar gage, and particularly preferably of over approx. 700 bar gage. A cryogenic pressurized container is suitable in particular for storing the fuel at temperatures which are considerably below the operating temperature (meaning the temperature range of the vehicle environment in which the vehicle is to be operated) of the motor vehicle, for example at least 50 Kelvin, preferably at least 100 Kelvin or at least 150 Kelvin below the operating temperature of the motor vehicle (generally approx.−40° C. to approx.+85° C.).

The technology disclosed here will now be described with reference to the drawings, in which:

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 2 shows a pressure/temperature graph.

DETAILED DESCRIPTION OF THE DRAWINGS

Figure 1:
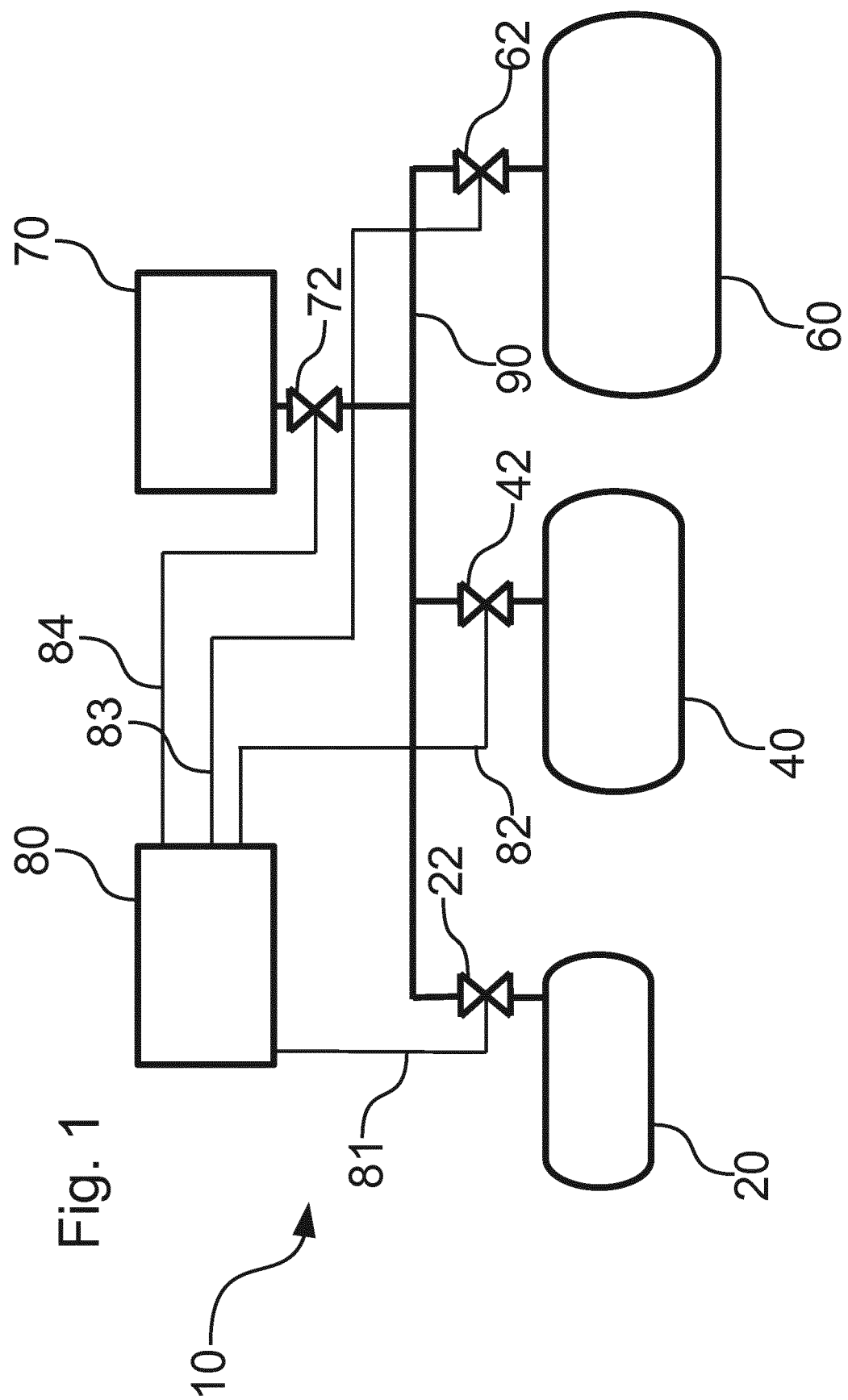
FIG. 1 shows a schematic view of the pressurized container system disclosed here.

FIG. 1 shows a schematic view of the pressurized container system 10 disclosed here. The pressurized container system 10 includes a first pressurized container 20, a second pressurized container 40 and a third pressurized container 60. The pressurized container system 10 can include two, three, four, five or more than five pressurized containers. The three pressurized containers 20, 40, 60 have different volumes, i.e. spaces of different sizes are available in each case for storing the fuel. It is also conceivable for the volumes of the pressurized containers 20, 40, 60 to be the same in each case.

The fuel can be $CGH_2$ or CNG.

The pressurized container system 10 is arranged in a vehicle, e.g. a car, a truck, a bus, a watercraft or an aircraft. The fuel in the pressurized container system 10 is supplied from the pressurized containers 20, 40, 60 to a fuel conversion device (not shown) which is designed to power the vehicle. When the fuel is hydrogen, the fuel conversion device can be a fuel cell 70.

Each of the pressurized containers 20, 40, 60 comprises a respective tank shut-off valve 22, 42, 62, by means of which the inflow and outflow of fuel from the pressurized container 20, 40, 60 can be shut off. The pressurized containers 20, 40, 60 are fluidically connected to one another by a fluid line 90. The pressurized containers 20, 40, 60 are additionally fluidically connected to a fuel cell 70 (or in general terms to a fuel conversion device) by the fluid line 90. The inflow of fuel from the pressurized containers 20, 40, 60 can be shut off by a fuel cell valve 72.

The three pressurized container shut-off valves 22, 42, 62 and the fuel cell valve 72 are each connected to a control unit 80 of the pressurized container system 10 by a control line 80-84. The control unit 80 can open and close the respective valves 22, 42, 62, 72. By corresponding opening and closing of the valve 22, 42, 62, 72, the control unit 80 can thus allow fuel to flow out of, or supply fuel from, one or more pressurized containers 20, 40, 60 into one or more other pressurized containers 20, 40, 60 or supply fuel to the fuel cell 70.

The control unit 80 detects the temperatures and pressures of the fuel in each of the pressurized containers 20, 40, 60 and the amount of fuel in each of the pressurized containers 20, 40, 60 and the density of the fuel in each of the pressurized containers 20, 40, 60. The control unit 80 additionally detects the ambient temperature and/or the temperature of the pressurized containers 20, 40, 60. Furthermore, the extent of the pressure losses of the fuel from the refueling coupling of the pressurized container system 10, by means of which the pressurized container system 10 is connected to a filling system (filling station) or a filling source, to the respective pressurized container 20, 40, 60 is stored in the control unit 80. The respective maximum operating pressure of the respective pressurized container 20, 40, 60 and the respective volume or internal volume or storage volume of the pressurized container 20, 40, 60 which are used to store the fuel are stored in the control unit 80. It is also conceivable for this information to be stored externally, i.e. outside the control unit 80, and for the control unit 80 to be able to access this information.

The control unit 80 controls the pressurized container valves 22, 42, 62 and the fuel cell valve 72 before the start of a setpoint or refueling process in such a way that, in the pressurized containers 20, 40, 60, in each case optimum pressures and/or temperatures are present, and adjusts the optimum pressures (pressure setpoints) and/or temperatures (temperature setpoints). In the setpoint, fuel is supplied from a single filling source (e.g. a filling station or filling system) to the pressurized container system 10 and thus to the pressurized containers 20, 40, 60. A single filling source means that the pressurized containers 20, 40, 60 are connected to a filling system for example by means of a refueling coupling. Even if the filling system comprises a plurality of pressurized containers 20, 40, 60, the filling system represents a single filling source, since the fuel is supplied from the filling system into all the pressurized containers 20, 40, 60.

The fuel is supplied to the pressurized containers 20, 40, 60 at the same time and for the same length of time (the time interval between the start of the setpoint and the end of the setpoint is the same length). The setpoint (of all the pressurized containers 20, 40, 60) is ended when the pressure of the fuel in the pressurized container system or in a first pressurized container has reached the maximum refueling pressure or target refueling pressure in accordance with the standard SAE J2600_201510, or the pressurized container system or the vehicle notifies the filling system that the target fill level (state of charge; SOC) of the pressurized containers has been reached (or the user manually terminates the setpoint). However, at that point in time, the fuel in the other pressurized containers 20, 40, 60 generally has not reached the target refueling pressure or the target fill level, since when the setpoint started, the fuel in the pressurized containers 20, 40, 60 had different temperatures and/or pressures.

The target refueling pressure (in accordance with the SAE standard) is defined for the pressurized container system as a whole. During the setpoint, a pressurized container 20, 40, 60 will firstly reach the target refueling pressure, and the setpoint is ended. Depending on the pressure losses to the individual pressurized containers 20, 40, 60, the other pressurized containers 20, 40, 60 have the same pressure or have slight deviations therefrom (generally downward deviations), but the other pressurized containers 20, 40, 60 have another temperature and thus another fill level or fuel density. The temperature development in the pressurized containers 20, 40, 60 is dependent on the thermal mass of the pressurized containers 20, 40, 60 and on the individual behavior with respect to heat exchange with the environment (as a result of the installation space and the material thickness of the wall(s) of the pressurized containers 20, 40, 60).

The temperature and/or pressure of the fuel in the pressurized containers 20, 40, 60 is now brought closer to a temperature setpoint and/or a pressure setpoint for said pressurized container 20, 40, 60 in each case by means of an overflow or supply of fuel from one or more pressurized containers 20, 40, 60 into one or more other pressurized containers 20, 40, 60 or by selective extraction of fuel from one pressurized container 20, 40, 60 and supply of the fuel to the fuel conversion device (e.g. fuel cell 70). Fuel is extracted from a pressurized container 20, 40, 60 (and used or supplied to another pressurized container 20, 40, 60) until the temperature and/or the pressure of the fuel in the respective pressurized container 20, 40, 60 corresponds or is equal to the temperature setpoint and/or pressure setpoint of the respective pressurized container 20, 40, 60, or until the refueling process is started by the user.

The temperature setpoints and/or pressure setpoints for the respective pressurized containers 20, 40, 60 are determined in such a way that, at the end of a setpoint in which all the pressurized containers 20, 40, 60 are filled with the same fuel (having the same temperature and same pressure) at the same time and for the same length of time, the amount of fuel introduced into the pressurized containers 20, 40, 60 is as high as possible. Thus, a particularly large amount of fuel is stored in the pressurized container system 10. The fuel should have as high a density as possible.

Introducing as much fuel as possible into the pressurized container system or into the pressurized containers 20, 40, 60 means that the average fill level of the pressurized containers 20, 40, 60 weighted according to the volume or internal volume or storage volume of the pressurized containers 20, 40, 60 is as high as possible, i.e. the fill level of pressurized containers 20, 40, 60 having a large volume or internal volume or storage volume for storing fuel outweighs the fill level of pressurized containers 20, 40, 60 having a small volume.

The amount of fuel introduced can be determined by the detected density and detected temperature (and the volumes) of the individual pressurized containers 20, 40, 60.

FIG. 2 shows a pressure/temperature graph, wherein the temperature of the fuel is indicated on the x-axis, and the pressure of the fuel (in the respective pressurized containers 20, 40, 60) is indicated on the y-axis.

Each characteristic curve family shows the profile of the temperature and the pressure of the fuel for a pressurized container 20, 40, 60. A pressurized container system comprising five pressurized containers thus has for example five characteristic curve families. In FIG. 2, for the sake of better visibility and for better understanding, characteristic curves from two characteristic curve families (namely a characteristic curve family for the first pressurized containers 20 and a characteristic curve family for the second pressurized containers 40) are drawn in.

The characteristic curves in each characteristic curve family depict the profile of the temperature relative to the pressure for different initial conditions of the fuel in the pressurized containers 20, 40, 60.

The maximum operating pressure (MOP) is the same for all the pressurized containers 20, 40, 60. It is conceivable for the maximum operating pressure of the different pressurized containers 20, 40, 60 to be different. In accordance with the standard SAE J2600_201510, the target refueling pressure is 875 bar (MOP) at the end of the refueling or filling at 85° C. ($T_{max}$). The fill level line 100, which corresponds to a completely filled state of a/the pressurized container(s) 20, 40, 60, is drawn in by a line in FIG. 2.

Four characteristic curves 110, 120, 130, 140 depict the profile of the pressure and the temperature of the fuel while filling the pressurized containers 20, 40, 60 with fuel from a (single) fuel source (e.g. fuel having a temperature and a pressure from one filling station). Initially, the first pressurized container 20 has a temperature T1 and a pressure P1, whereas the second pressurized container 40 has a temperature T2 which is higher than temperature T1, and a pressure P2 which is higher than the pressure P1. If the two pressurized containers 20, 40 are then filled, the setpoint will end if the fuel in the first pressurized container 20 has reached the target refueling pressure, or if the refueling system is notified by the pressurized container system of a fill level or SOC of 100%. At that point in time, the first pressurized container 20 would also have reached the maximum fill level (=100%). However, the fill level of the second pressurized container 40 would be below the maximum value.

Therefore, the control unit 80 controls the valves 22, 42, 62, 72 in such a way that fuel flows from the second pressurized container 40 into the first pressurized container 20 before the setpoint. As a result, the characteristic curve 110 of the first pressurized container 20 (shown by a dashed line) is shifted upwards to the right (since pressure and temperature increase in the first pressurized container 20), and the characteristic curve 140 of the second pressurized container 40 (shown by a dashed line) is shifted downwards to the left (since pressure and temperature decrease in the second pressurized container 40). A new target refueling pressure in accordance with the SAE standard is then detected. Then (in the case of the then prevailing characteristic curve 120 of the first pressurized container 20 and the then prevailing characteristic curve 130 of the second pressurized container 40), when the new target refueling pressure is detected, the fill level of the first pressurized container 20 reaches the maximum value (100%) or a value close to the maximum value (100%). The fill level of the second pressurized container 40 at the end of the setpoint is then higher. The average fill level of the pressurized containers 20, 40 (weighted according to the volume of the pressurized containers 20, 40) is higher. Therefore, more fuel can be introduced into the pressurized container system 10 or the pressurized containers 20, 40 in the setpoint.

The control unit 80 can correspondingly control or adjust the temperatures and/or the pressures of the fuel in the pressurized containers 20, 40, 60 during the extraction or match said temperatures and/or pressures to the temperature setpoints and/or pressure setpoints when the control unit 80 detects that a setpoint is (immediately) imminent. This can be determined by an input by the driver (a refueling button is actuated, which prepares the vehicle for refueling) and/or predictive refueling detection, for example by means of data from the navigation system, historical customer behavior, evaluation of images of the surroundings (filling station detection). By adjusting the temperatures and/or pressures of the fuel in the pressurized containers 20, 40, 60 before reaching or upon reaching the filling system, time is saved, since there is no need to wait for the temperatures and/or pressures to be adjusted or for the temperatures and/or pressures to be matched to the temperature setpoints and/or pressure setpoints. The noise burden to which the driver or user is subjected by noises produced during the overflow of fuel from one pressurized container 20, 40, 60 into the other pressurized containers 20, 40, 60 is additionally reduced.

When determining the temperature setpoints and/or pressure setpoints that are sought or to be adjusted, the ambient temperature, the temperature of the fuel from the filling source, different types of filling systems (different temperatures of the fuel, different achievable final refueling pressures), different volumes of the pressurized containers 20, 40, 60, the temperature of the pressurized containers 20, 40, 60 themselves and/or pressure losses during transport from the refueling coupling of the vehicle, for connecting the pressurized containers 20, 40, 60 to the filling system, to the respective pressurized container 20, 40, 60 can be taken into consideration. For the different variables mentioned, there can also be different characteristic curve family groups.

The filling system (e.g. the filling station) or filling source can transmit the current conditions of the filling system or filling source (e.g. actual temperature of the fuel, which can deviate from the specifications of the standard, −20° C. or −40° C., achievable final refueling pressures) or the conditions thereof which are to be expected at the time of the expected arrival of the vehicle at the filling system or filling source to the control unit 80 (e.g. by means of mobile radio communication and/or an Internet connection) so that these values are taken into consideration when determining the temperature setpoints and/or pressure setpoints.

The values to be taken into consideration can be covered by different characteristic curve families or characteristic curve family groups. Depending on the condition of the filling system or filling source, for example a different characteristic curve family group is used. Each characteristic curve family group includes a plurality of characteristic curve families, namely a respective characteristic curve family per pressurized container 20, 40, 60. Each characteristic curve family includes characteristic curves which indicate the development of pressure and temperature for different amounts of fuel in the respective pressurized containers and different initial conditions (temperature, pressure and amount of fuel at the start of the setpoint) of the pressurized containers.

Rather than being determined on the basis of characteristic curve families or characteristic curve family groups, the temperature setpoints and/or pressure setpoints of the respective pressurized container can also be calculated by means of formulae. The calculation for this can take place in the vehicle or outside the vehicle (e.g. on a server).

For reasons of readability and simplicity, the expression "at least one" has been partially omitted. If a feature of the technology disclosed here is described in the singular or in an indeterminate manner (e.g. the/a control unit etc.), the plurality thereof should also be disclosed at the same time (e.g. the at least one control unit etc.).

The previous description of the present invention is used only for illustrative purposes and not for the purpose of restricting the invention. Within the scope of the invention, various changes and modifications are possible without going beyond the scope of the invention and the equivalents thereof.

LIST OF REFERENCE NUMERALS

10 pressurized container system
20 first pressurized container
22 first tank shut-off valve
40 second pressurized container
42 second tank shut-off valve
60 third pressurized container
62 third tank shut-off valve
70 fuel cell
72 fuel cell shut-off valve
80 control unit
81 control line to first tank shut-off valve
82 control line to second tank shut-off valve
83 control line to third tank shut-off valve
84 control line to fuel cell shut-off valve
90 fluid line
100 fill level line
110 first characteristic curve
120 second characteristic curve
130 third characteristic curve
140 fourth characteristic curve The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for adjusting the temperature and/or the pressure of fuel, in a pressured container system of a vehicle having a plurality of pressurized containers, to a respective temperature setpoint and/or a respective pressure setpoint for each of the plurality of pressurized containers, before a process of filling the pressurized containers is initiated, the method comprising:
   extracting fuel from a first pressurized container, wherein the fuel in the first pressurized container has a first temperature and a first pressure, to bring the first temperature and/or the first pressure of the fuel closer to the temperature setpoint and/or to the pressure setpoint of the first pressurized container, before the process of filling the pressurized containers is initiated;
   supplying, based on a determination from a control unit of the pressured container system, the fuel extracted from the first pressurized container to:
   (1) a fuel conversion device to power the vehicle, and/or
   (2) a second pressurized container, wherein the fuel in the second pressurized container has a second temperature and a second pressure, so as to bring the second temperature and/or the second pressure of the fuel closer to the temperature setpoint and/or to the pressure setpoint of the second pressurized container, before the process of filling the pressurized containers is initiated; and
   determining the respective temperature setpoints and/or the respective pressure setpoints for each of the plurality of the pressurized containers such that, without exceeding the respective maximum operating pressure and the respective maximum operating temperature of each of the respective pressurized containers, the amount of fuel introduced from a single filling source, by the process of filling the pressurized containers that is carried out at the same time and for the same length of time, is maximized, wherein the determination is before the process of filling the pressurized containers is initiated.

2. The method as claimed in claim 1, wherein the method is carried out in response to detecting that a process of filling the pressurized containers is imminent.

3. The method as claimed in claim 2, wherein determining the temperature setpoints and/or the pressure setpoints of the pressurized containers comprises determining the temperature setpoints and/or the pressure setpoints of the pressurized containers based on characteristic curve families for the pressurized containers, wherein the characteristic curve families each have a plurality of characteristic curves for the temperature of the fuel according to the pressure of the fuel for different initial conditions of the fuel in the respective pressurized containers at the start of the process of filling the pressurized containers with fuel from a single filling source.

4. The method as claimed in claim 2, wherein determining the temperature setpoints and/or the pressure setpoints of the pressurized containers comprises determining the temperature setpoints and/or the pressure setpoints of the pressurized containers based on a plurality of characteristic curve family groups for different temperatures of the fuel to be filled and/or different temperatures of the respective pressurized container, wherein each characteristic curve family group includes a plurality of characteristic curve families for the temperature of the fuel according to the pressure of the fuel for the different pressurized containers during the process of filling the pressurized containers with fuel from a single filling source.

5. The method as claimed in claim 2, further comprising, taking into consideration, when determining the temperature setpoints and/or the pressure setpoints of the pressurized containers, pressure losses during transport from the refueling coupling of the vehicle, for connecting the pressurized containers to the filling source, to the respective pressurized containers.

6. The method as claimed in claim 2, wherein the control unit makes the determination as to whether the fuel extracted from the first pressurized container is supplied to the fuel conversion device or to the second pressurized container depending on whether enough time remains until the planned process of filling the pressurized containers to match the temperatures and/or the pressures of the pressurized containers to the respective temperature setpoints and/or pressure setpoints of the pressurized containers solely by a selective extraction of fuel from the pressurized container(s) of which the temperatures and/or pressures do not already correspond to the respective temperature setpoints and/or pressure setpoints, and supplying the fuel to the fuel conversion device.

7. The method as claimed in claim 1, wherein determining the temperature setpoints and/or the pressure setpoints of the pressurized containers comprises determining the temperature setpoints and/or the pressure setpoints of the pressurized containers based on characteristic curve families for the pressurized containers, wherein the characteristic curve families each have a plurality of characteristic curves for the temperature of the fuel according to the pressure of the fuel for different initial conditions of the fuel in the respective pressurized containers at the start of the process of filling the pressurized containers with fuel from a single filling source.

8. The method as claimed in claim 7, further comprising, taking into consideration, when determining the temperature setpoints and/or the pressure setpoints of the pressurized containers, pressure losses during transport from the refueling coupling of the vehicle, for connecting the pressurized containers to the filling source, to the respective pressurized containers.

9. The method as claimed in claim 7, wherein the control unit makes the determination as to whether the fuel extracted from the first pressurized container is supplied to the fuel conversion device or to the second pressurized container depending on whether enough time remains until the planned process of filling the pressurized containers to match the temperatures and/or the pressures of the pressurized containers to the respective temperature setpoints and/or pressure setpoints of the pressurized containers solely by a selective extraction of fuel from the pressurized container(s) of which the temperatures and/or pressures do not already correspond to the respective temperature setpoints and/or pressure setpoints, and supplying the fuel to the fuel conversion device.

10. The method as claimed in claim 1, wherein determining the temperature setpoints and/or the pressure setpoints of the pressurized containers comprises determining the temperature setpoints and/or the pressure setpoints of the pressurized containers based on a plurality of characteristic curve family groups for different temperatures of the fuel to be filled and/or different temperatures of the respective pressurized container, wherein each characteristic curve family group includes a plurality of characteristic curve families for the temperature of the fuel according to the pressure of the fuel for the different pressurized containers during the process of filling the pressurized containers with fuel from a single filling source.

11. The method as claimed in claim 10, further comprising, taking into consideration, when determining the temperature setpoints and/or the pressure setpoints of the pressurized containers, pressure losses during transport from the refueling coupling of the vehicle, for connecting the pressurized containers to the filling source, to the respective pressurized containers.

12. The method as claimed in claim 10, wherein the control unit makes the determination as to whether the fuel extracted from the first pressurized container is supplied to the fuel conversion device or to the second pressurized container depending on whether enough time remains until the planned process of filling the pressurized containers to match the temperatures and/or the pressures of the pressurized containers to the respective temperature setpoints and/or pressure setpoints of the pressurized containers solely by a selective extraction of fuel from the pressurized container(s) of which the temperatures and/or pressures do not already correspond to the respective temperature setpoints and/or pressure setpoints, and supplying the fuel to the fuel conversion device.

13. The method as claimed in claim 1, further comprising, taking into consideration, when determining the temperature setpoints and/or the pressure setpoints of the pressurized containers, pressure losses during transport from the refueling coupling of the vehicle, for connecting the pressurized containers to the filling source, to the respective pressurized containers.

14. The method as claimed in claim 13, wherein the control unit makes the determination as to whether the fuel extracted from the first pressurized container is supplied to the fuel conversion device or to the second pressurized container depending on whether enough time remains until the planned process of filling the pressurized containers to match the temperatures and/or the pressures of the pressurized containers to the respective temperature setpoints and/or pressure setpoints of the pressurized containers solely by a selective extraction of fuel from the pressurized container(s) of which the temperatures and/or pressures do not already correspond to the respective temperature setpoints and/or pressure setpoints, and supplying the fuel to the fuel conversion device.

15. The method as claimed in claim 1, wherein determining the temperature setpoints and/or the pressure setpoints of the pressurized containers comprises determining the temperature setpoints and/or the pressure setpoints of the pressurized containers based according to the temperature of the fuel in a filling system and/or the maximum final refueling pressure of the filling system.

16. The method as claimed in claim 1, wherein the control unit makes the determination as to whether the fuel extracted from the first pressurized container is supplied to the fuel conversion device or to the second pressurized container depending on whether enough time remains until the planned process of filling the pressurized containers to match the temperatures and/or the pressures of the pressurized containers to the respective temperature setpoints and/or pressure setpoints of the pressurized containers solely by a selective extraction of fuel from the pressurized container(s) of which the temperatures and/or pressures do not already correspond to the respective temperature setpoints and/or pressure setpoints, and supplying the fuel to the fuel conversion device.

17. A pressurized container system in a vehicle, comprising:
  a plurality of pressurized containers configured to store a fuel, and which are fluidically connected to one another and to a fuel conversion device by valves, wherein the fuel in each of the plurality of pressurized containers has a respective temperature and a respective pressure; and
  a control unit configured to open and/or close the valves such that fuel can be extracted from the first pressurized container and supplied to either a fuel conversion device or into a second pressurized container, before the process of filling the pressurized containers is initiated,
  wherein the control unit is further configured to adjust the respective temperatures and/or the pressures of the fuel in the plurality of pressurized containers towards a respective temperature setpoint and/or a respective pressure setpoint of respective pressurized containers, before a process of filling the pressurized containers, such that, in the plurality of pressurized containers, the amount of fuel introduced by the process of simultaneously filling the pressurized containers from a single filling source, is maximized, without exceeding the respective maximum operating pressure and the respective maximum operating temperature of the respective pressurized container.

18. The pressurized container system as claimed in claim 17, wherein the control unit is configured such that the control unit determines whether the fuel extracted from the first pressurized container is supplied to the fuel conversion device or to the second pressurized container depending on whether enough time remains until the planned process of filling the pressurized containers to match the temperatures and/or the pressures of the pressurized containers to the respective temperature setpoints and/or pressure setpoints of the pressurized containers solely by a selective extraction of fuel from the pressurized container(s) of which the temperatures and/or pressures do not already correspond to the respective temperature setpoints and/or pressure setpoints, and supplying the fuel to the fuel conversion device.

19. The pressurized container system as claimed in claim 18, wherein the control unit is configured such that the control unit determines the temperature setpoints and/or the pressure setpoints of the pressurized containers based on characteristic curve families, wherein the characteristic curve families each have a plurality of characteristic curves for the temperature of the fuel according to the pressure of the fuel for different initial conditions of the fuel in the respective pressurized containers at the start of the process of filling the pressurized containers with fuel from a single filling source.

20. The pressurized container system as claimed in claim 17, wherein the control unit is configured such that the control unit determines the temperature setpoints and/or the pressure setpoints of the pressurized containers based on characteristic curve families, wherein the characteristic curve families each have a plurality of characteristic curves for the temperature of the fuel according to the pressure of the fuel for different initial conditions of the fuel in the respective pressurized containers at the start of the process of filling the pressurized containers with fuel from a single filling source.

* * * * *